July 30, 1935.  E. R. DARLING  2,009,391
FOOD PRODUCT
Filed Aug. 7, 1933
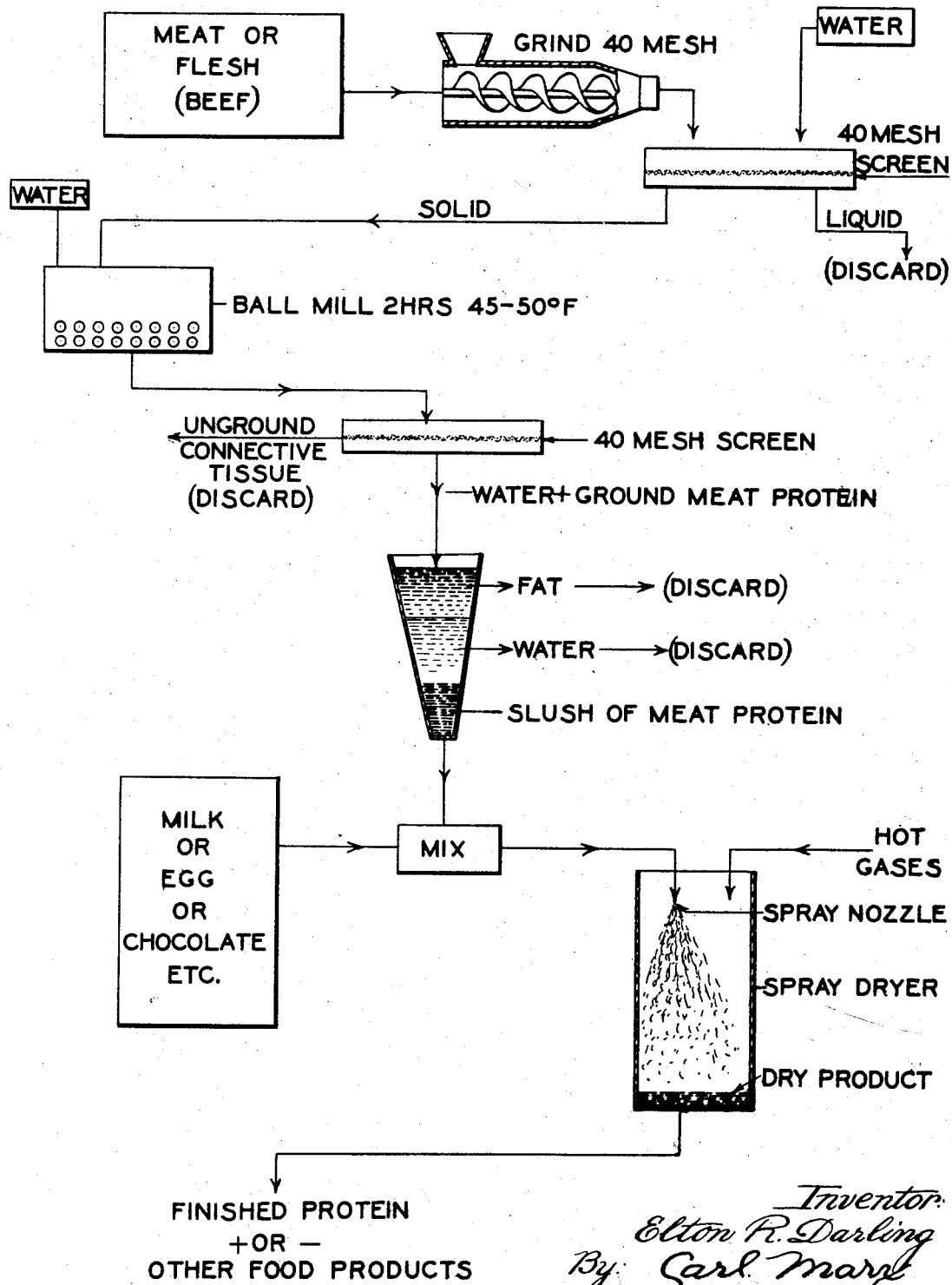

Patented July 30, 1935

2,009,391

UNITED STATES PATENT OFFICE 2,009,391

FOOD PRODUCT

Elton R. Darling, Chicago, Ill., assignor to Chappel Bros. Inc., Rockford, Ill., a corporation of Delaware Application August 7, 1933, Serial No. 684,013

6 Claims. (Cl. 99—11)

The present invention relates to an improved process for extracting from meat or fleshy tissue a highly nutritious, readily digestible and easily peptonized protein product. The invention also relates to the product that is obtained and to products containing the same in greater or smaller proportion.

One of the objects of the invention is to extract from meat or flesh certain undesirable water soluble constituents, as well as fats and indigestible material, such as connective tissue, with the resultant production of a powdered protein which is of a high degree of digestibility.

A further object of the invention is to produce a food product consisting of the aforesaid protein in combination with dried milk, dried egg, chocolate and the like, either singly or in combination.

In order that the present invention may be more readily understood, there is filed concurrently with the present specification a drawing in the form of a flow sheet, in which the various steps of the process are diagrammatically illustrated. This flow sheet, being provided with necessary legends, is self-explanatory and hence requires no detailed elucidation herein.

Reduced to its simplest terms, the present invention contemplates the following steps, to which meat such as beef, for example, may be subjected:

The meat is first trimmed from as much of the fat as possible and is then ground to a medium degree of fineness in an ordinary meat grinder or chopper. The size of the individual particles, however, should be larger than 40 mesh. The meat thus ground is placed into a suitable container and is therein treated with cold water, preferably at a temperature between 45° and 50° F., under conditions minimizing the development of putrefactive bacteria.

The extraction with water is carried out for about two hours, whereupon the extracted meat is placed upon a suitable screen, whereupon it is washed with water. At this stage all of the red coloring of the meat will have disappeared by the washing out therefrom of the water soluble portions as well as the blood. The thus extracted meat product, together with a new supply of water, is then placed into a ball mill, together with stone pebbles or balls of from 1 inch to 2 inches in diameter, and is therein subjected to trituration or grinding. This trituration comminutes the meat and physically separates it from the relatively resistant connective tissue. The trituration is continued for about two hours at the aforesaid low temperature, whereupon the contents of the ball mill are discharged through a very coarse screen merely to separate the grinding stones or pebbles, whereupon the material passing through the coarse screen is passed through a 40-mesh screen. This screen will retain the connective tissue, cartilage and the like, while the fibrous portion of the meat will pass through the screen together with the water. The slush thus obtained is placed into a rather tall vessel, wherein it is allowed to settle, which takes place rather slowly. During this settling, whatever fat may have been contained between the tissues of the meat rises to the top and may be skimmed off while the protein product settles to the bottom. It is thus easy to separate the fat, the supernatant liquid and the protein slush. This slush is then separated from the water by any suitable means but preferably by spray-drying. It may advantageously, however, be mixed with milk or with raw egg or with a solution of egg albumen or with the suspension of chocolate in milk, and simultaneously spray-dried so as to yield a compound food product.

The present invention is predicated upon the theory that the indigestibility, at least to many people, of blood meats such as beef and lamb is due to the presence therein of a relatively high amount of connective tissue which is very difficult to peptonize and hence leaves the stomach in an undigested condition. This is particularly true of persons who have a weak stomach and those who are troubled with stomach ulcers. It is also true to some extent of a person suffering from a deficiency of pepsin. In any event, if such undigested or unpeptonized connective tissue is passed from the stomach into the intestinal regions, it will not be absorbed therein but rather will be subjected to fermentative or bacterial decomposition causing gas and development of poisons which, being absorbed into the system, give rise to a number of troublesome and dangerous symptoms. This difficulty is particularly noticeable with very young children, usually at the age in which they are undergoing the transition from a pure milk diet to a diet including meats and proteins. Inasmuch, however, as the growing child is definitely in need of such proteins, it is necessary to provide them in the most easily digestive form, and it has been found that the product resulting from the process herein described, particularly when mixed with milk, is a highly advantageous food product for administration to young children.

It is obvious that the process may be somewhat modified provided only that there is brought about an effective removal, first of the water soluble materials and secondly of the connective tissue and cartilage, and, incidentally, also of the fat, so that there is finally obtained a substantially water-insoluble, blood-free, cartilage-free meat protein.

As an alternative to the precise method described, it may be stated that the meat may be roughly chopped up and leached with water, preferably distilled water, and at the low temperature stated, for about two hours, and then triturated in a ball mill at a similar temperature and with a fresh supply of distilled water for about two hours. It will be found that this trituration effectively liberates the connective tissue so that it is not difficult to remove it by merely passing the product through a 40-mesh sieve. The desired product passing with the water through this sieve may be recovered by heating the suspension thereof to about 60° C., which will coagulate it and cause it to assume a flocculent condition in which it may be readily filtered from the solution and then dried. It is much preferred, however, to resort to spray drying in order to get a finely powdered product. For example, the slush contained in the desired protein is sprayed into a tall tower, to which there is admitted at the same time, at the top thereof, a large volume of highly heated gases, the gases and the suspension of protein passing simultaneously toward the bottom of the chamber or tower. During the descent of the protein particles, the water therein contained will evaporate, so that by the time the product reaches the bottom of the tower it will be substantially dried.

A very superior product is obtained by allowing the suspension of protein in water to settle as thoroughly as possible or by subjecting it to centrifugal action. In any event, the concentrated slush may then be mixed with an equal volume,—or more, or less,—of fresh milk thoroughly homogenized by stirring or other form of agitation, whereupon the resultant mixture is then spray-dried in a regular milk dryer of the type well known in the spray-drying of milk. The product thus obtained therefore contains not only the meat protein but also all the constituents of the milk other than the water.

As a further alternative, whole eggs may be thoroughly beaten or whipped, and then mixed with the slush of meat protein and dried in a similar manner, as has been described in connection with the milk. If desired, only the whites of the eggs may be used, or only the yolks, and it is also within the contemplation of the inventor to use milk and eggs, or egg constituents, simultaneously. A very desirable product is obtained by mixing chocolate or egg with milk, then adding the slush of meat protein, and spray-drying the resultant mixture. The meat-protein suspension may, if desired, be mixed with gastric mucin and then dried, or the dried product may be mixed with a dry gastric mucin preparation and thus used as a food particularly suitable for persons afflicted with peptic ulcers, etc. These illustrative embodiments of the invention are, however, not to be considered as a limitation thereon, as obviously other food products may be mixed with the slush and then dried, or may be mixed with the dried product resulting from the spray-drying operation.

It may be stated that the final suspension of the meat protein in water is substantially neutral and has a hydrogen ion concentration range of pH 6.9–7.1. The dried material, when analyzed, gives a protein content of about 78%. Experiments made in connection with the working out of the present invention tend to show that when the protein is dried together with the milk, a sort of combination takes place. In any event, the powder obtained by the simultaneous spray-drying of milk and the meat protein slush yields a different appearing and different tasting product than when spray-dried milk and spray-dried meat protein slush are mixed after separate drying. What this reaction is has not as yet been ascertained.

The finished product, preferably of the spray-dried form, may be either fed directly or placed into soups, gravies, or milk, or sprinkled upon breakfast food, or may be served by placing it on the table in a salt shaker for consumption of individuals in accordance with their tastes. The product has a very pleasing meaty taste and therefore forms a desirable addition to soups and sauces. Tests made therewith have shown that it is extremely rapidly peptonized by pepsin under ordinary conditions, such as exist in even weak stomachs, and that therefore it can be taken even by persons suffering from indigestion with the assurance that it will not set up intestinal fermentation or similar disturbances.

As an indication of the desired degree of washing during the first stage of the process, it may be stated that this should be carried out until the meat is substantially colorless and the water is running through practically clear. What it is desired to remove at this stage is the blood, serum and water soluble proteins.

No particular use has as yet been found for the connective tissue produced by the process, and it may therefore be discarded or worked up into fertilizer together with other refuse from a meat packing plant.

The process is inexpensive to carry out and, if worked under aseptic conditions and in clean apparatus, will yield a product sufficiently sterile so that it will pass the requirements of the Food and Drugs Acts of the United States and the various individual States thereof. Just what the product is in chemical terminology cannot definitely be stated except that it may be characterized as the essential protein portion of meat or flesh, and in the appended claims the term "meat protein" is used to include the protein of such flesh animals as cattle, sheep, swine, goats, rabbits, and horses.

The best results are obtained by using rump beef. The small amount of fat present therein makes it particularly suitable for the present purposes, for any small amount of fat that may remain readily rises to the top during the settling process. If, however, an absolutely fat-free product is desired, the finished spray-dried material may be subjected to the action of an organic nonpoisonous fat solvent such as trichloroethylene, carbon tetrachloride, or the like. For most purposes, however, if the raw material is well trimmed, such a removal of fat is not necessary.

Saving for himself such equivalents as occur to those skilled in the art to which the present application relates, what the inventor desires to protect by Letters Patent is contained in the hereunto appended claims.

I claim:

1. The process of producing a readily digested meat-protein preparation, which comprises extracting comminuted meat with water, triturating the extracted meat in the presence of water by means of attrition grinding, separating the substantially unground connective tissue therefrom, and drying the resulting finely divided meat-protein.

2. The process of producing a readily digested meat-protein preparation, which comprises comminuting meat, extracting it with water to remove blood, serum and solubles therefrom, triturating the extracted meat with water in a ball mill until it is finely enough divided to pass through a 40-mesh screen, passing the resultant meat particles and water through a 40-mesh screen whereby the connective tissue remains on the latter, and recovering the meat protein from the material which has passed through said screen.

3. The process of producing a readily digested meat-protein preparation, which comprises extracting water-soluble constituents from meat, triturating the extracted meat by attrition in the presence of water so as to effect the liberation of the meat fibers from the connective tissue, separating said fibers from said tissue, and recovering said fibers.

4. The process of producing a readily digested meat-protein preparation, which comprises extracting water-soluble constituents from meat, triturating the extracted meat in the presence of water by means of a ball mill at a temperature of not above 50° to comminute the meat and bring about its separation into fibers and connective tissue, filtering the triturated mass to separate said tissue from the fibers which remain in the filtrate, and recovering and drying said fibers.

5. The process of producing a readily digested meat-protein preparation, which comprises comminuting meat to particles of a size larger than 40 mesh, leaching and washing the meat with water, triturating the meat under water in a ball mill under conditions inhibiting the development of bacteria until finely enough divided to pass through a 40 mesh screen, filtering the resulting slush of meat fibers and water to remove the substantially unground connective tissue, and recovering the meat fibers and drying the same.

6. The process of producing a readily digested meat-protein preparation, which comprises comminuting meat to particles of a size larger than 40 mesh, leaching and washing the meat with water, triturating the meat under water in a ball mill under conditions inhibiting the development of bacteria until ground finely enough to pass through a 40-mesh screen, filtering the resulting slush of meat fibers and water to remove the substantially unground connective tissue, and recovering the meat fibers and drying the same by spraying them into a drying chamber.

ELTON R. DARLING.